(12) United States Patent
Kyong

(10) Patent No.: US 7,151,858 B2
(45) Date of Patent: Dec. 19, 2006

(54) WAVELET EDGE MAP BASED APPARATUS AND METHOD FOR EDGE ENHANCEMENT

(75) Inventor: Bo-hyun Kyong, Seoul (KR)

(73) Assignee: Samsung Electronics Co., Ltd. (KR)

( * ) Notice: Subject to any disclaimer, the term of this patent is extended or adjusted under 35 U.S.C. 154(b) by 559 days.

(21) Appl. No.: 10/232,834

(22) Filed: Sep. 3, 2002

(65) Prior Publication Data

US 2003/0118248 A1  Jun. 26, 2003

(30) Foreign Application Priority Data

Dec. 21, 2001 (KR) ............................... 2001-82482

(51) Int. Cl.
*G06K 9/40* (2006.01)
(52) U.S. Cl. ..................... 382/266; 382/261; 382/265
(58) Field of Classification Search ................. 382/266
See application file for complete search history.

(56) References Cited

U.S. PATENT DOCUMENTS

| 5,081,692 | A | * | 1/1992 | Kwon et al. ............... 382/263 |
| 5,717,789 | A | * | 2/1998 | Anderson et al. .......... 382/254 |
| 5,799,112 | A | * | 8/1998 | de Queiroz et al. ....... 382/254 |
| 5,835,614 | A | * | 11/1998 | Aoyama et al. ............ 382/104 |
| 5,905,579 | A | * | 5/1999 | Katayama et al. ......... 358/296 |
| 6,002,794 | A | * | 12/1999 | Bonneau et al. ........... 382/166 |
| 6,055,340 | A | * | 4/2000 | Nagao ........................ 382/261 |

(Continued)

FOREIGN PATENT DOCUMENTS

| JP | 06-223172 | 8/1994 |
| JP | 2000-306089 | 2/2000 |
| JP | 2001-008027 | 1/2001 |

(Continued)

OTHER PUBLICATIONS

Feng, L., Tang, Y.Y., Yang, L.H., A wavelet approach to extracting contours of document images, Sep. 20-22, 1999, Document Analysis and Recognition, 1999. ICDAR '99. Proceedings of the Fifth International Conference on, INSPEC Accession No. 6352795.*

(Continued)

*Primary Examiner*—Samir Ahmed
*Assistant Examiner*—Sath V. Perungavoor
(74) *Attorney, Agent, or Firm*—Sughrue Mion, PLLC

(57) ABSTRACT

An apparatus and method for correcting the sharpness of an image signal, using a Haar Wavelet transform and a difference between pixel values adjacent to the edge of the image signal to be corrected while reducing the occurrence of overshoot and undershoot at the edge of the image signal, are provided. The apparatus includes an edge detector for detecting data on the edge of the image signal, by performing a multi-stage Haar Wavelet transform on the image signal, a gain detector for detecting a gain for correcting the image edge, a pixel value detector for detecting a corrected pixel value regarding the edge data at a position to be corrected by performing an operation on the edge data, at least one pixel adjacent to the edge data, and the gain, and an image signal generator for generating an image whose edge is formed based on the corrected pixels.

13 Claims, 5 Drawing Sheets

U.S. PATENT DOCUMENTS

| | | | |
|---|---|---|---|
| 6,373,992 B1* | 4/2002 | Nagao | 382/266 |
| 6,611,627 B1* | 8/2003 | LaRossa et al. | 382/240 |
| 6,628,842 B1* | 9/2003 | Nagao | 382/266 |
| 6,667,815 B1* | 12/2003 | Nagao | 358/1.9 |
| 6,801,672 B1* | 10/2004 | Thomas | 382/275 |
| 6,956,975 B1* | 10/2005 | Young | 382/263 |
| 2002/0181797 A1* | 12/2002 | Young | 382/260 |
| 2003/0228064 A1* | 12/2003 | Gindele et al. | 382/260 |

FOREIGN PATENT DOCUMENTS

| | | |
|---|---|---|
| JP | 2001-309206 | 2/2001 |

OTHER PUBLICATIONS

Japanese Office Action dated Nov. 15, 1005 corresponding to application No. 2002-308881.

* cited by examiner

WAVELET EDGE MAP BASED APPARATUS AND METHOD FOR EDGE ENHANCEMENT

BACKGROUND OF THE INVENTION

1. Field of the Invention

The present invention relates to an apparatus and method for correcting the edge of an image, and more particularly, to an apparatus and method for correcting the sharpness of the edge of an image. The present application is based on Korean Patent Application No. 2001-82482, which is incorporated herein by reference.

2. Description of the Related Art

In general, the quality of an image is determined by the sharpness of the edge of the image. Thus, techniques for correcting the sharpness of the edge of an image have been developed.

FIG. 1 is a block diagram of a conventional apparatus for correcting the edge of an image. Referring to FIG. 1, when an image signal is input to a first differentiator 101, the first differentiator 101 differentiates the image signal and measures the intensity and direction of the edge of the image signal. Then, a second differentiator 102 differentiates the image signal from the first differentiator 101 and extracts the edge of the image signal. The second differentiator 102 measures only the intensity of the edge of the image signal. The edge of the image extracted in the second differentiator 102 forms a closed curve. The extracted edge of the image is transmitted to a multiplier 103. Then, the multiplier 103 multiplies the edge of the image by a predetermined gain so that the sharpness of the extracted edge can be corrected. The edge data from the multiplier 103 is transmitted to a coring 104.

The coring 104 blocks the amplification of noise present in the low frequency band. Accordingly, the coring 104 compares the edge data transmitted from the multiplier 103 with a predetermined value and converts the edge data, which has a lower frequency band than the predetermined value, into 0. The converted edge data is transmitted to an adder 105.

Next, the adder 105 adds the edge data image from the coring 104 and the input image signal and then transmits the result to a clipping circuit 106. The clipping circuit 106 clips the image signal from the adder 105 so that its luminance level falls within a range of 0–255. The clipped image signal is output as an image signal whose edge is improved.

However, the second differentiator 102 is not sensitive to an image signal whose brightness changes gradually. Thus, it is difficult to detect the edge of an image whose brightness gradually changes using the apparatus of FIG. 1. Further, the apparatus of FIG. 1 is set such that the extracted edge data of an image is multiplied by a fixed gain using the first and second differentiators 101 and 102, irrespective of the brightness level of the edge. Thus, there is a possibility of overshoot or undershoot occurring at the edge of an image when the edge of an image signal is to be corrected using the apparatus of FIG. 1.

SUMMARY OF THE INVENTION

To solve the above problems, it is an object of the present invention to provide an apparatus and method for correcting the sharpness of the edge of an image using the Haar Wavelet transform technique, and a difference between the neighboring pixels, while reducing the occurrence of overshoot and undershoot at the edge of the image.

To achieve an aspect of the above object, there is provided an apparatus for correcting the edge of an image, the apparatus including an edge detector for detecting data on the edge of the input image signal, by performing a multi-stage Haar Wavelet transform on the image signal, a gain detector for detecting a gain for correcting the image edge by normalizing the edge data at a position to be corrected out of the edge data detected by the edge detector, a pixel value detector for detecting corrected pixel values regarding the edge data at a position to be corrected by performing an operation on the edge data to be corrected, at least one pixel adjacent to the edge data, and the gain, and an image signal generator for generating an image whose edge is formed based on the corrected pixels.

Preferably, the edge detector performs the Haar Wavelet transform on the input image signal without causing down sampling thereof.

Preferably, the edge detector includes a horizontal coefficient detector for detecting a horizontal coefficient of the image signal by performing an operation on a transform coefficient obtained through the multi-stage Haar Wavelet transform, a vertical coefficient detector for detecting a vertical coefficient of the image signal by performing an operation on the transform coefficient obtained through the multi-stage Haar Wavelet transform, and an adder for adding the horizontal and vertical coefficients so as to measure a 2-D coefficient, and outputting the 2-D coefficient as edge data.

Preferably, the pixel value detector includes an average detector for detecting a mean value of the edge data at a position to be corrected and the adjacent pixel, a difference detector for detecting a difference between the mean value and the edge data to be corrected, a correction value detector for detecting a corrected value by multiplying the gain by the difference, and a corrected pixel value detector for adding the corrected value and the edge data to be corrected, and outputting the result as a corrected pixel.

To achieve another aspect of the above object, there is provided a method of correcting the edge of an image, the method including detecting a mean value of the edge data at a position to be corrected and the adjacent pixel, detecting a difference between the mean value and the edge data to be corrected, detecting a corrected value by multiplying the gain by the difference, and adding the corrected value and the edge data to be corrected, and outputting the result as a corrected pixel.

BRIEF DESCRIPTION OF THE DRAWINGS

The above object and advantages of the present invention will become more apparent by describing in detail a preferred embodiment thereof with reference to the attached drawings in which.

DETAILED DESCRIPTION OF THE INVENTION

Figure 1:
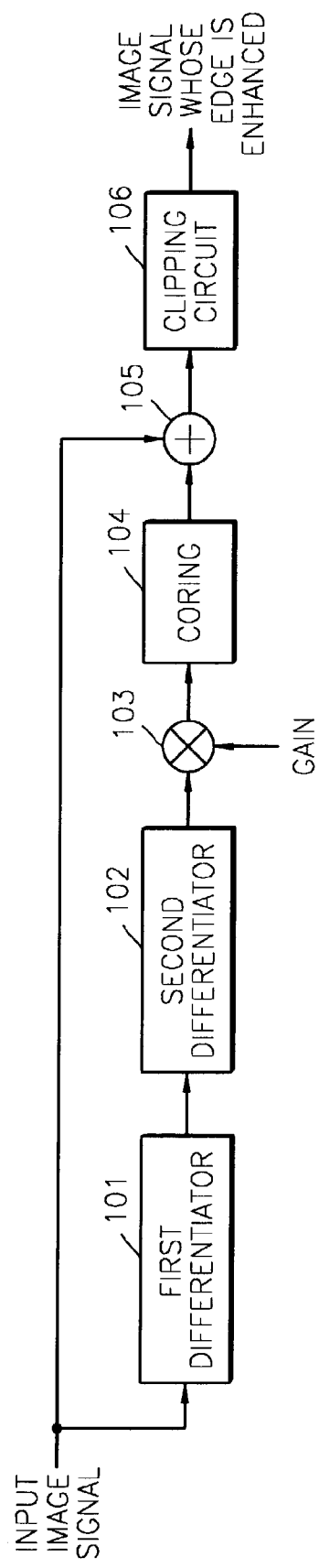
FIG. 1 is a block diagram of a conventional apparatus for correcting the edge of an image.
Figure 2:
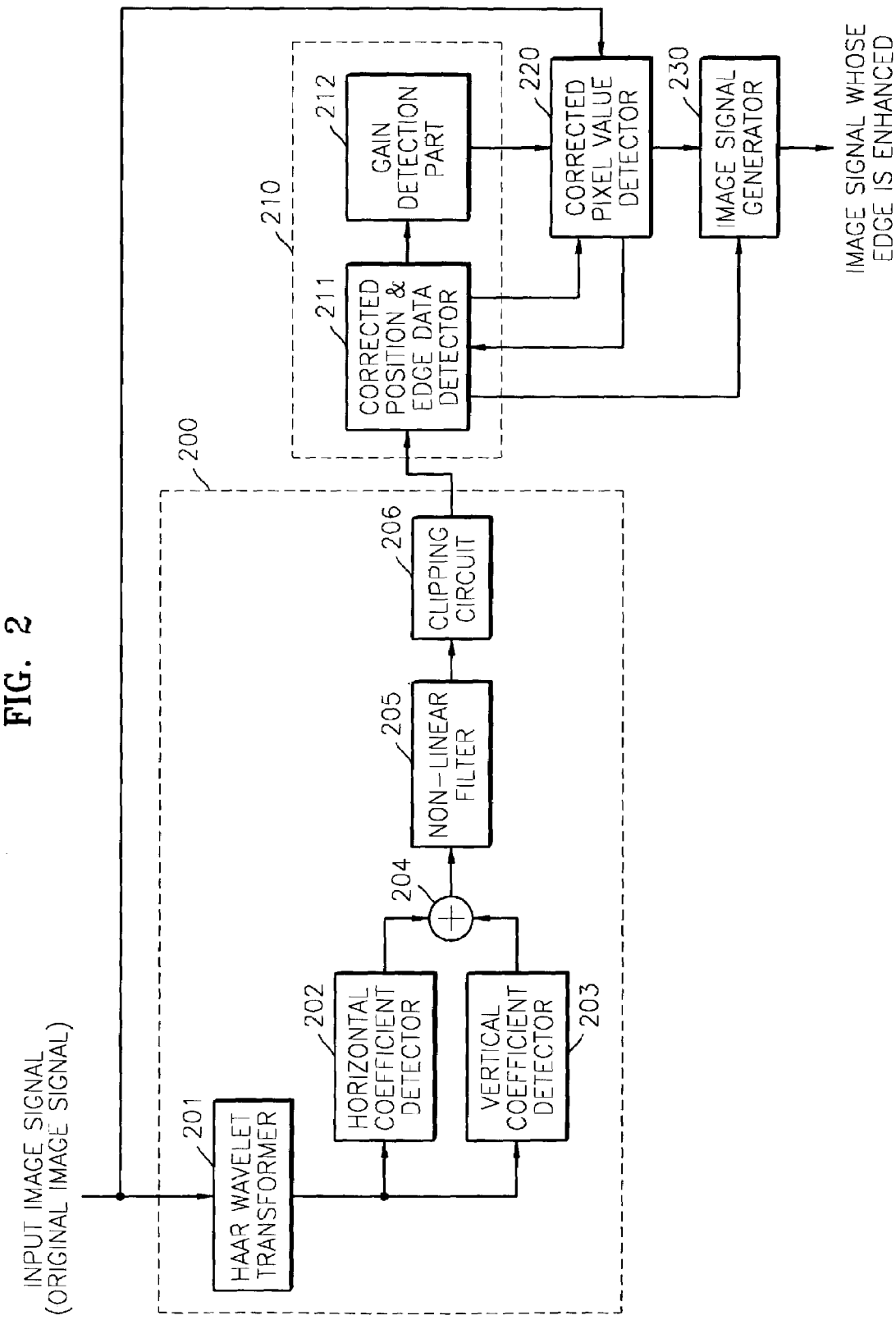
FIG. 2 is a block diagram of an apparatus for correcting the edge of an image according to the present invention.

FIG. 2 is a block diagram of an apparatus for correcting the edge of an image according to a preferred embodiment of the present invention. The apparatus of FIG. 2 includes an edge detector 200, a gain detector 210, a corrected pixel value detector 220, and an image signal generator 230.

The edge detector 200 detects the edge of an input image signal using transform coefficients obtained through a multi-staged 'Haar Wavelet Transform' of an input image signal, i.e., an original image signal. To achieve this, the edge detector 200 includes a Haar Wavelet transformer 201, a horizontal coefficient detector 202, a vertical coefficient detector 203, an adder 204, a non-linear filter 205, and a clipping circuit 206.

Figure 3:
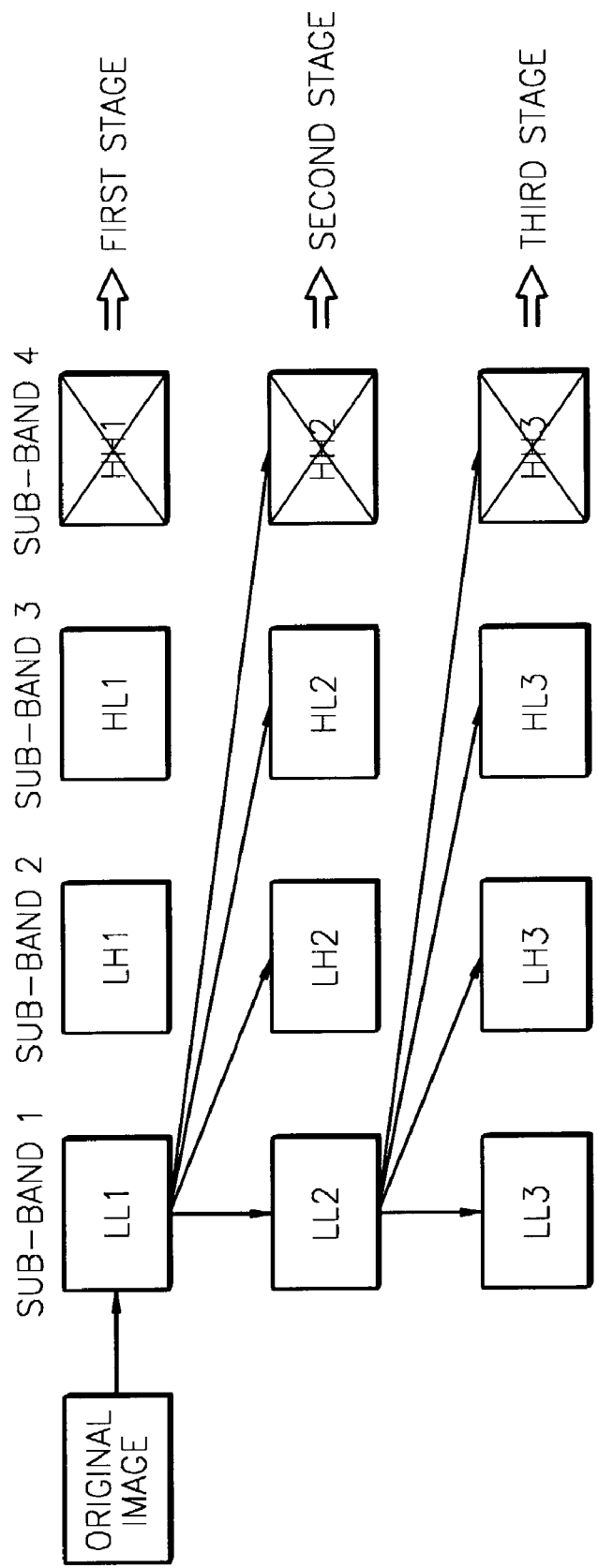
FIG. 3 is a view illustrating a process of performing a three-stage Haar Wavelet transform on an image signal in the Haar Wavelet transformer illustrated in FIG. 2.

The Haar Wavelet transformer 201 performs a three-stage Haar Wavelet transform on an image signal without down sampling thereof, as illustrated in FIG. 3. That is, when an image signal is input to the Haar Wavelet transformer 201, it performs the first stage of a Haar wavelet transform, which does not result in down sampling, on the image signal using a wavelet filter having filter characteristics as defined in the following equation 1:

$$c_j(n) = \sum_{k=0}^{N-1} h(k-n) c_{j+1}(k) \quad (1)$$

$$d_j(n) = \sum_{k=0}^{N-1} g(k-n) c_{j+1}(k)$$

wherein h(k−n) and g(k−n) denote wavelet filters, $c_{j+1}(k)$ denotes a pixel value of an input image signal, $c_j(n)$ denotes data on $c_{j+1}(k)$ that is low-pass filtered according to the filter characteristics of h(k−n), and $d_j(n)$ denotes data on $c_{j+1}(k)$ that is high-pass filtered according to the filter characteristics of g(k−n).

Once the first stage of the Haar Wavelet transform is performed on the input image signal using the wavelet filter as defined in equation (1), an image that is divided into sub-bands 1, 2, 3 and 4 is obtained as illustrated at the first stage in FIG. 3.

Sub-band 1 contains image data LL1 having low frequency in the horizontal and vertical directions; sub-band 2 contains image data LH1 having low frequency in the vertical direction, and high frequency in the horizontal direction; sub-band 3 contains image data HL1 having high frequency in the vertical direction and low frequency in the horizontal direction; and sub-band 4 contains image data HH1 having high frequency in the vertical and horizontal directions. However, sub-band 4 is not used in the present invention. The image data contained in sub-bands 1, 2, 3 and 4 can be expressed as in the following equation (2), based on equation (1):

$LL1(x, y)=c_j(n)c_j(n)$ $LH1(x, y)=c_j(n)d_j(n)$ $HL1(x, y)=d_j(n)c_j(n)$ $HH1(x, y)=d_j(n)d_j(n)$ (2)

Then, the Haar Wavelet transformer 201 performs a second stage of the Haar Wavelet transform, which does not result in down sampling, on the image signal using sub-band 1 out of the sub-bands obtained in the first stage. As a result, an image divided into sub-bands LL2, LH2, HL2, and HH2 is obtained. Here, the four-divided sub-bands based on LL1 are obtained by equations 1 and 2. The sub-band HH2 is not used in the present invention.

Next, the Haar Wavelet transformer 201 performs a third stage of the Haar Wavelet transform, which does not result in down sampling, on the image signal using sub-band LL2, out of the sub-bands obtained in the second stage. As a result, an image that is divided into four sub-bands LL3, LH3, HL3, and HH3 is obtained. Here, the four-divided sub-bands based on LL2 can be also obtained by equations 1 and 2. The sub-band HH3 is not used in the present invention.

The reason why the above Haar Wavelet transform is adopted in detecting the edge of the image signal is to obtain high-frequency components of the image signal, using a difference between two pixel values adjacent to the image signal. If the difference between these two pixel values is large, a difference of brightness between these pixels in the original image is large. This means that a gain for correcting the edge of the image must be large. Therefore, the Haar Wavelet transform is used in order to determine the gain for correcting the edge of the image in consideration of a difference of brightness between these pixels.

The transform coefficients of the sub-bands, which were obtained through the three-stage transform by the Haar Wavelet transform 201, are transmitted to the horizontal coefficient detector 202 and the vertical coefficient detector 203.

Thereafter, the horizontal coefficient detector 202 multiplies the transform coefficient having units of pixels in sub-band HL1, which was obtained by the first stage of the Haar Wavelet transform, by the correspondent transform coefficient having units of pixels in the sub-band HL3, which was obtained by the third stage of the Haar Wavelet transform. Then, the horizontal coefficient detector 202 adds the result and the correspondent transform coefficient having units of pixels in sub-band HL2, which was obtained by the second stage of the Haar Wavelet transform, and outputs the result as a horizontal coefficient of a pixel corresponding to the input image signal.

The vertical coefficient detector 203 multiplies the transform coefficient having units of pixels in sub-band LH1, which was obtained by the first stage of the Haar Wavelet transform, by the correspondent transform coefficient having units of pixels in the sub-band LH3, which was obtained by the third stage of the Haar Wavelet transform. Then, the vertical coefficient detector 203 adds the result and the correspondent transform coefficient having units of pixels in the sub-band LH2, which was obtained by the second stage of the Haar Wavelet transform, and outputs the result as a vertical coefficient of a pixel corresponding to the input image signal.

The adder 204 performs a matrix addition of the horizontal coefficients transmitted from the horizontal coefficient detector 202, and the vertical coefficients transmitted from the vertical coefficient detector 203, and outputs the results, which are two-dimensional (2-D) coefficients. The 2-D coefficients are the data on the edge of the input image signal. The edge data are transmitted to the non-linear filter 205.

Then, the non-linear filter 205 performs horizontal filtering (X-axis filtering), and vertical filtering (Y-axis filtering) of the 2-D coefficients, respectively, adds the results of the two filtering processes, and outputs a signal having a frequency bandwidth that approximates the edge of the image.

The clipping circuit 206 clips a gray level of the image edge data transmitted from the non-linear filter 205 so that the gray level falls within a range from 0 to 255. Here, the clipping circuit 206 has the same structure as the existing clipping circuits. An image signal output from the clipping circuit 206 is a frame image signal composed of edge data detected by the Haar Wavelet transform.

The gain detector 210 detects gains for correcting the edge of the image using the edge data detected by the edge detector 200. To achieve this, the gain detector 210 includes a corrected position & edge data detector 211, and a gain detection part 212.

The corrected position & edge data detector 211 detects the position of the image edge to be corrected based on the edge data transmitted from the clipping circuit 206. Here, the previous method of correcting the edge of an image is used. When the position is detected, the corrected position & edge data detector 211 detects edge data of the detected position out of the edge data transmitted from the clipping circuit 206. The detected edge data is transmitted to the gain detector 212. The data of the position to be corrected is transmitted to the corrected pixel value detector 220.

The gain detector 212 normalizes the received edge data to 1 and detects the normalized value as a gain for correcting the edge of the image in order to determine the gain according to the brightness of a pixel.

The corrected pixel value detector 220 receives the position data of the edge to be corrected from the corrected position & edge data detector 211. Then, based on the position data of the edge, the corrected pixel value detector 220 detects a pixel value of the edge position to be corrected from an input image signal and a pixel value adjacent to the edge position to be corrected. In the event that the adjacent pixel value is adjacent to the edge position to be corrected in the right and left directions, the corrected pixel value detector 220 detects the above adjacent pixel values from an input image signal. Also, the corrected pixel value detector 220 detects a pixel value corresponding to the edge data to be corrected, using a gain detected by the gain detector 212.

Figure 4:
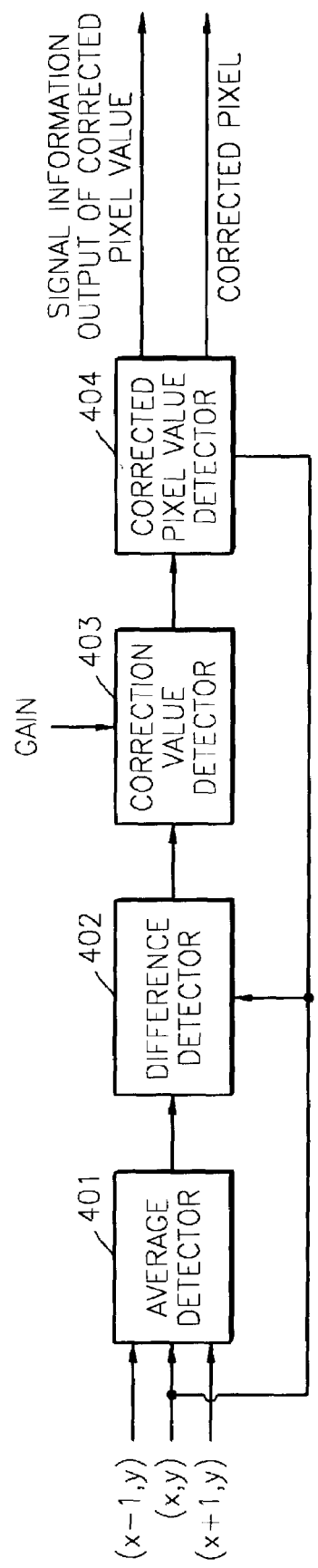
FIG. 4 is a block diagram of the corrected pixel value detector of FIG. 2.

The corrected pixel value detector 220 includes an average detector 401, a difference detector 402, a correction value detector 403, and a corrected pixel value detector 404 as illustrated in FIG. 4.

The average detector 401 calculates a mean value ave of the edge data (x,y) to be corrected, and pixel values (x−1, y) and (x+1, y) that are adjacent to the edge position, i.e., ave=(x,y)+(x−1, y)+(x+1, y)/3. The calculated mean value ave is transmitted to the difference detector 402. Then, the difference detector 402 calculates a difference diff between the edge data (x,y), and the mean value ave.

The correction value detector 403 multiplies the gain detected by the gain detector 212 by the difference diff detected by the difference detector 402. Therefore, in the event that the difference diff is large, a value of the edge data to be corrected becomes large, whereas in the event that the difference diff is small, a value of the edge data to be corrected becomes small. Here, the difference diff may be one of a negative integer, a positive integer, or 0.

The corrected pixel value detector 404 adds a corrected value detected by the correction value detector 403 and the edge data to be corrected, and outputs the result as a corrected pixel. If the corrected value is a positive integer, the corrected pixel value is detected such that the edge data has a higher or lighter luminance level than before, whereas if the corrected value is a negative integer, the corrected pixel is detected such that the corresponding edge data has a lower or darker luminance level than before.

The corrected pixel value detector 404 outputs a signal informing the output of a corrected pixel value to the corrected position & edge data detector 211. The corrected pixel value is transmitted to the image signal generator 230.

When the corrected position & edge data detector 211 receives the signal informing the output of the corrected pixel value, which corresponds to the edge data to be corrected, the corrected position & edge data detector 211 checks whether the correction of all data regarding the edge of an image present in a frame is completed. As a result, if it is determined that the correction is completed, the corrected position & edge data detector 211 informs the image signal generator 230 of the completion, and then terminates the correction of the edge of the frame. However, when data regarding the edge of the image, which needs to be corrected, is still present in the frame, the corrected position & edge data detector 211 detects the position of the related edge, and detects the corrected pixel value corresponding to the edge data as described above.

The image signal generator 230 receives the signal informing the completion of the correction of the edge of the corresponding frame from the corrected position & edge data detector 211, and generates an image signal whose edge is formed based the corrected pixel value transmitted from the corrected pixel value detector 220. The generated image signal is the image signal whose edge is corrected according to the present invention.

Figure 5:
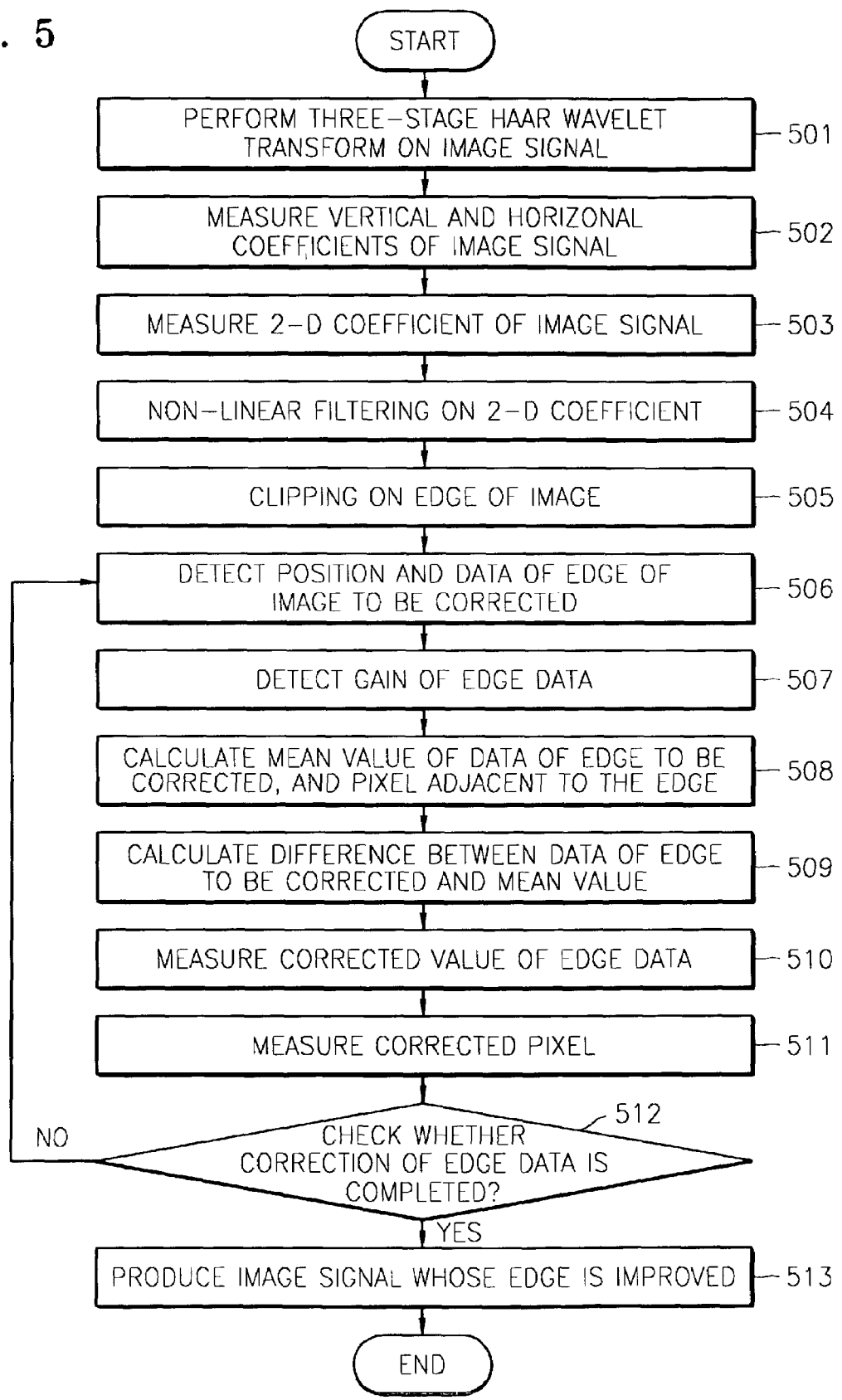
FIG. 5 is a flow chart explaining a method of correcting the edge of an image according to the present invention.

FIG. 5 is a flow chart explaining a method of correcting the edge of an image according to the present invention. More specifically, the three-stage Haar Wavelet transform is performed on an input original image signal by the Haar Wavelet transformer 201 of FIG. 2 as described above (s501), thereby obtaining sub-bands illustrated in FIG. 3. Then, vertical and horizontal coefficients of the original image signal are each measured using the obtained sub-bands (s502). Here, the vertical and horizontal coefficients are detected as explained with respect to the horizontal coefficient detector 202 and the vertical coefficient detector 203 of FIG. 2.

Next, a matrix addition is performed on the vertical and horizontal coefficients so as to measure a 2-D coefficient (s503). The measured 2-D coefficient corresponds to data regarding the edge of the original image input.

Thereafter, the 2-D coefficient is non-linear filtered (s504) so as to detect the data on the edge of the image more precisely. Then, the edge data, which was non-linear filtered, is clipped such that its luminance level falls within a range from 0 to 255 (s505).

Then the position of the edge of the image to be corrected is detected from the frame image signal having the clipped edge data (s506). If the position of the edge is detected, the data of the edge at the detected position is detected from the clipped frame image signal.

Next, the detected edge data is normalized to 1 (s507), and the normalized value is detected as a gain of the edge data to be corrected. Then a mean value ave of edge data to be corrected and a pixel adjacent to the edge to be corrected is measured (s508). Here, the pixel adjacent to the edge means at least one pixel adjacent to the edge. In this embodiment, the mean value ave is obtained by measuring a pixel and two neighboring pixels in the left and right directions. In the event that the edge of the image to be corrected is positioned at a point (x,y) of the original image signal, the neighboring two pixels may be ones positioned at points (x−1, y) and (x+1, y) of the original image signal. However, the neighboring pixels may be pixels adjacent to the edge of the image to be corrected in the upper and lower directions, or in the upper, lower, right and left directions.

Thereafter, a difference between data of the edge of the image to be corrected, and the mean value ave is calculated (s509). In other words, the mean value ave is subtracted from the edge data. The difference may be a positive integer, a negative integer, or 0. If the data difference is a positive integer, the edge data is corrected such that the luminance level of the edge data of the original signal is increased, whereas if the data difference is a negative integer, the edge data is corrected such that its luminance level is decreased. Otherwise, if the difference is 0, its luminance level is maintained.

Then, the difference is multiplied by a gain detected in step 507, so as to measure a corrected value of the edge data to be corrected (s510).

Next, the corrected value is added to the edge data so as to measure a corrected pixel value, i.e., (x,y)+corrected pixel value (s511). The corrected pixel value has a pixel value that has the improved brightness.

Then, it is checked whether the correction of the edge data of the corresponding frame is completed or not (s512). If it is determined that the correction is not yet completed, the correction of the edge is performed again by returning back to step 506.

However, if it is determined that the correction has been completed, an image signal whose edge is improved based on the corrected pixel, is produced, and the correction is terminated (s513). The generated image signal has an image whose brightness is enhanced.

According to the present invention, data regarding the edge of an original image signal is detected by performing a multi-stage Haar Wavelet transform on an original image signal. Then, a gain for correcting the edge of the image is determined using the detected edge data, and an image signal whose edge is corrected is produced using the determined gain and neighboring pixels present in the original image signal, thereby reducing the occurrence of overshoot and undershoot at the edge of the image. As a result, it is possible to produce an image having high resolution.

While the present invention has been particularly shown and described with reference to a preferred embodiment thereof, it will be understood by those skilled in the art that various changes in form and details may be made therein without departing from the spirit and scope of the invention as defined by the appended claims.

What is claimed is:

1. An apparatus for correcting the edge of an input image, the apparatus comprising:

an edge detector which outputs an image signal by performing a multi-stage Haar Wavelet transform on the input image, wherein the output image signal comprises edge data of the input image, the edge detector comprising:

a Haar Wavelet transformer that performs the multi-stage Haar Wavelet transform in at least three stages without causing down sampling thereof, the image signal outputted by the multi-stage Haar Wavelet transform being divided into first, second, third and fourth sub-bands, a horizontal coefficient detector for detecting a horizontal coefficient of the image signal by performing a first operation on a transform coefficients obtained through the multi-stage Haar Wavelet transform, the first operation comprising:

receiving a first transform coefficient having units of pixels, the first transform coefficient being generated from third sub-band having a high frequency in a vertical direction and a low frequency in a horizontal direction, the first transform coefficient being obtained by a first stage of the multi-stage Haar Wavelet transform, receiving a second transform coefficient having units of pixels, the second transform coefficient being generated from third sub-band having a high frequency in a vertical direction and a low frequency in a horizontal direction, the second transform coefficient being obtained by a second stage of the multi-stage Haar Wavelet transform, receiving a third transform coefficient having units of pixels, the third transform coefficient being generated from third sub-band having a high frequency in a vertical direction and a low frequency in a horizontal direction, the third transform coefficient being obtained by a third stage of the multi-stage Haar Wavelet transform, generating horizontal coefficients by multiplying the first transform coefficient and the third transform coefficient and adding the second coefficient to the result of the multiplication, outputting the horizontal coefficient of the image signal, a vertical coefficient detector for detecting a vertical coefficient of the image signal by performing a second operation on the transform coefficient obtained through the multi-stage Haar Wavelet transform; and an adder for adding the horizontal and vertical coefficients so as to measure a 2-D coefficient, and outputting the 2-D coefficient as edge data;

a gain detector which detects a gain for correcting the edge of the input image by normalizing the edge data at a position to be corrected, wherein the edge data is obtained from the image signal output from the edge detector;

a pixel value detector for detecting a corrected pixel value regarding the edge data at a position to be corrected by performing an operation on the edge data to be corrected, at least one pixel adjacent to the edge data, and the gain; and an image signal generator for generating an image whose edge is formed based on the corrected pixels.

2. The apparatus of claim 1, wherein the horizontal coefficient detector, the vertical coefficient detector, and the adder perform the first and second operations on the image signal and measure the 2-D coefficient, respectively, on a pixel by pixel basis.

3. The apparatus of claim 1, wherein the edge detector further comprises:

a filter for non-linear filtering the edge data; and a clipping unit for clipping the edge data output from the filter so that the brightness level of the edge data falls within a predetermined range.

4. The apparatus of claim 1, wherein the transform coefficient on which the first or second operation is performed does not include image data having low frequency in both horizontal and vertical directions.

5. The apparatus of claim 1, wherein the gain detector comprises:

a corrected position and edge data detector for detecting the position and the edge data of the image to be corrected out of the edge data detected by the edge detector; and a gain detector for normalizing to 1 the edge data, which was detected by the corrected position and edge data detector, and for detecting the normalized value as the gain.

6. The apparatus of claim 1, wherein the pixel adjacent to the edge data comprises pixels adjacent to the pixel to be corrected in the right and left directions.

7. The apparatus of claim 6, wherein the pixel value detector comprises:
    an average detector for detecting a mean value of the edge data at a position to be corrected and the adjacent pixel;
    a difference detector for detecting a difference between the mean value and the edge data to be corrected;
    a correction value detector for detecting a corrected value by multiplying the gain by the difference; and
    a corrected pixel value detector for adding the corrected value and the edge data to be corrected, and outputting the result as a corrected pixel.

8. The apparatus of claim 1, wherein the pixel value detector comprises:
    an average detector for detecting a mean value of the edge data at a position to be corrected and the adjacent pixel;
    a difference detector for detecting a difference between the mean value and the edge data to be corrected;
    a correction value detector for detecting a corrected value by multiplying the gain by the difference; and
    a corrected pixel value detector for adding the corrected value and the edge data to be corrected, and outputting the result as a corrected pixel.

9. The apparatus of claim 1, wherein the gain detector receives a signal informing output of corrected pixel value in order to check whether correction of all data regarding the edge of the input image is completed.

10. A method of correcting the edge of an image signal, the method comprising:
    outputting an image signal by performing an operation based on multi-stage Haar Wavelet transform on the input image wherein the output image signal comprises edge data of the input image, the operation comprising:
        performing the multi-stage Haar Wavelet transform in at least three stages without causing down sampling thereof, the image signal outputted by the multi-stage Haar Wavelet transform being divided into first, second, third and fourth sub-bands;
        detecting a horizontal coefficient of the image signal by performing a first operation on a transform coefficients obtained through the multi-stage Haar Wavelet transform, the first operation comprising:
            receiving a first transform coefficient having units of pixels, the first transform coefficient being generated from third sub-band having a high frequency in a vertical direction and a low frequency in a horizontal direction, the first transform coefficient being obtained by a first stage of the multi-stage Haar Wavelet transform,
            receiving a second transform coefficient having units of pixels, the second transform coefficient being generated from third sub-band having a high frequency in a vertical direction and a low frequency in a horizontal direction, the second transform coefficient being obtained by a second stage of the multi-stage Haar Wavelet transform,
            receiving a third transform coefficient having units of pixels, the third transform coefficient being generated from third sub-band having a high frequency in a vertical direction and a low frequency in a horizontal direction, the third transform coefficient being obtained by a third stage of the multi-stage Haar Wavelet transform,
        generating horizontal coefficients by multiplying the first transform coefficient and the third transform coefficient and adding the second coefficient to the result of the multiplication,
        outputting the horizontal coefficient of the image signal; detecting a vertical coefficient of the image signal by performing a second operation on the transform coefficient obtained through the multi-stage Haar Wavelet transform; and
        adding the horizontal and vertical coefficients so as to measure a 2-D coefficient, and outputting the 2-D coefficient as edge data;
    detecting a gain for correcting the edge of the input image by normalizing the edge data at a position to be corrected, wherein the edge data is obtained from the output image signal;
    detecting a corrected pixel value regarding the edge data to be corrected by performing an operation on the gain, the edge data to be corrected, and at least one pixel adjacent to the edge data to be corrected; and
    generating an image whose edge is formed based on the corrected pixel value.

11. The method of claim 10, wherein detecting the corrected pixel value comprises:
    measuring a mean value of the edge data to be corrected and the pixel adjacent to the edge data;
    detecting a difference between the mean value and the edge data to be corrected;
    measuring a corrected value of the edge data by multiplying the gain by the difference; and
    detecting the corrected pixel value by adding the corrected value and the edge data to be corrected.

12. The method of claim 10, wherein detecting the gain comprises normalizing the edge data to be corrected and detecting the normalized value as the gain.

13. The method of claim 10, wherein detecting the gain further comprises an operation of receiving a signal informing output of corrected pixel value in order to check whether correction of all data regarding the edge of the input image is completed.

* * * * *